UNITED STATES PATENT OFFICE.

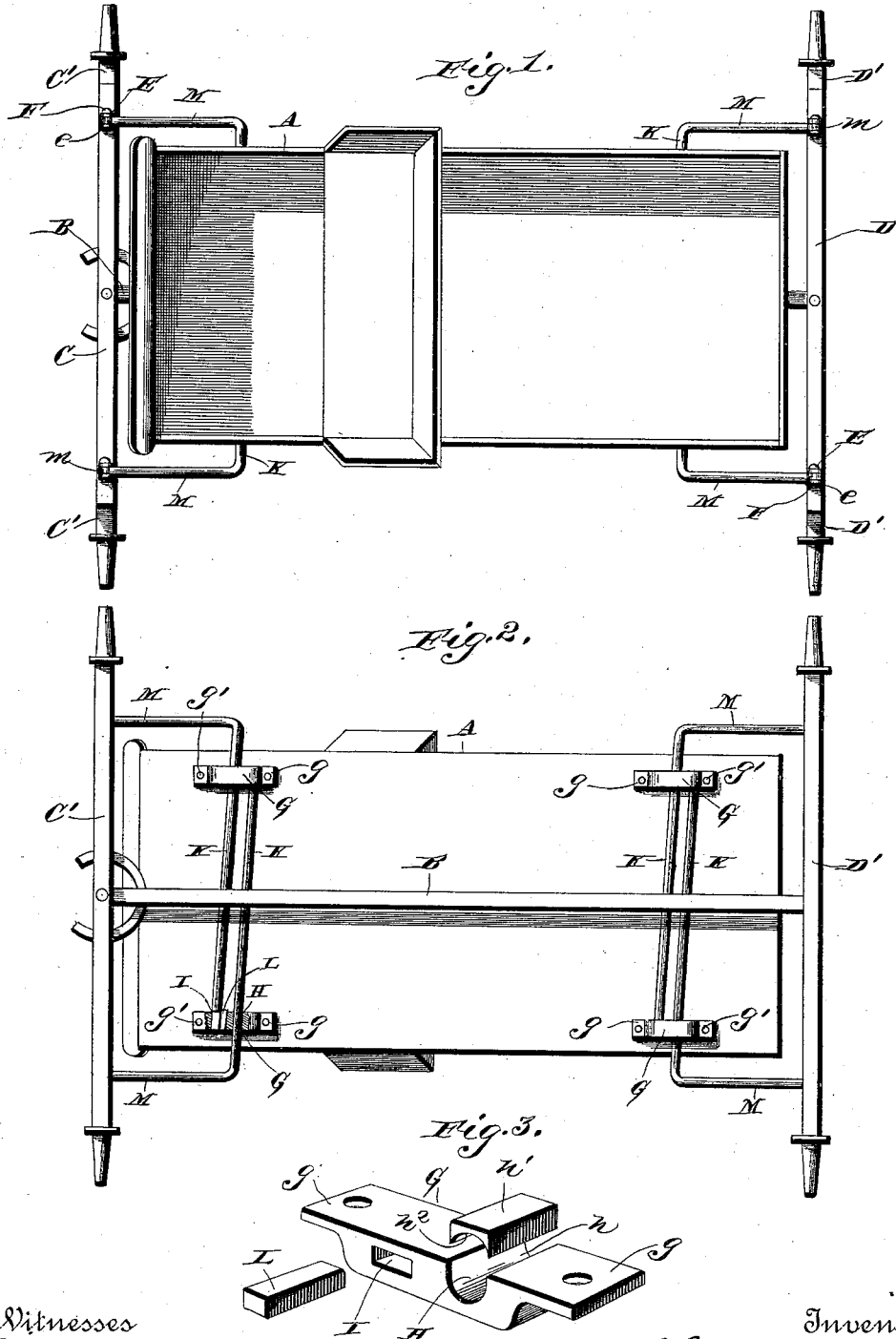

HARRY A. MYERS, OF FRANKLIN, PENNSYLVANIA.

VEHICLE-SPRING.

SPECIFICATION forming part of Letters Patent No. 376,104, dated January 10, 1888.

Application filed November 10, 1887. Serial No. 254,827. (No model.)

*To all whom it may concern:*

Be it known that I, HARRY A. MYERS, a citizen of the United States, residing at Franklin, in the county of Venango and State of Pennsylvania, have invented new and useful Improvements in Vehicle-Springs, of which the following is a specification.

My invention relates to improvements in vehicle-springs of that class commonly known as "torsion-springs," the novelty of which consists in the peculiar and effective means employed to secure the said springs to the bed of the body of the vehicle.

My present invention is an improvement upon the device shown in Letters Patent No. 366,500, which were granted to me July 12, 1887; and it consists in providing a spring box or bracket having a round bearing in which is journaled one end of the torsion-spring and a rectangular slot, in which the opposite end of another spring is placed—that is, each spring is carried across the under side of the bed or body of the vehicle, and it is journaled at one end in the bearing in one bracket and secured at the other end in the slot in the opposite bracket. The end of the spring which enters the said slot is squared, and it is held securely therein by a wedge or key which is driven into the slot on one side of the spring.

The invention consists, further, in forming the bearing in the said box or bracket with a removable cap to enable the wear on the bearing to be taken up, to thus prevent rattling.

The invention is more fully set forth hereinafter, in connection with the accompanying drawings, wherein—

Figure 1 is a top plan view of a vehicle provided with my improvements. Fig. 2 is a bottom plan view of the same. Fig. 3 is a detail perspective view of the bracket or spring-box.

Referring by letter to the accompanying drawings, A designates the body or bed of the vehicle; B, the reach or perch; C, the head-block; C', the front axle, to which the said head-block is attached; D, the rear axle cap, and D' the rear axle.

E E are spring-shackles, which are secured to the upper sides of the head-block and the axle-cap, which consist of the vertical parallel apertured ears $e$ $e$, through the aligned apertures, in which are passed the bolts F F.

G G designate the spring boxes or brackets, four in number, which are secured to the under side of the bed or body on opposite sides and near the ends thereof. Each bracket is provided with apertured ears $g$ $g$, through which are passed the screws or bolts $g'$ $g'$, to secure the bracket to the body. Each spring box or bracket is further provided with a round bearing, H, and a longitudinal slot, I. The bracket is provided in the upper edge with a recess, $h$, having a rounded lower end, and the cap $h'$, which fits in this recess, is provided in the under or lower side with a depression, $h^2$. This depression and the rounded lower end of the recess $h$ form together the bearing H. The block $h'$ is slightly wedge-shaped, to correspond with the slightly-converging sides of the recess $h$, and it will be seen that the cap may be let farther into the recess to make the bearing H smaller by filing the sides of either the recess or the cap. When the bracket is secured to the bed of the vehicle, the mouth or upper end of the recess $h$ will be closed, and therefore the cap, whose upper side is designed to come flush with the upper edge of the bracket, will be held securely in place.

K K designate the torsion springs, four in number, which are respectively journaled at one end in the bearing H in one of the brackets, and inserted at the other end in the slot I of the bracket on the opposite side of the body. The end of the spring which is inserted in the said slot is squared, to prevent it from turning, and a wedge or key, L, is driven into the slot on one side of the squared end of the spring.

M represents the arms, which are formed on one end of each spring by bending the portion of the said spring beyond the bearing parallel with the side of the wagon. The arms thus formed are respectively extended beyond the nearest end of the wagon-body—that is, the arms which are attached to the spring near the front end of the wagon are extended beyond the front end of the latter and the arms of the rear springs are extended beyond the rear end of the wagon. The ends of the arms M are provided with eyes $m$, which are journaled on the bolts F F between the apertured ears *e e*.

The operation of this device will now be seen. The portions of the spring adjacent to the arms M will turn or twist, and consequently revolve slightly in the bearings H H, while the opposite ends of the springs will be held rigid.

The main advantage gained in securing the squared ends of the springs in slots is that a key or wedge may be driven into the slot on one side of the spring, and thus securely bind the latter in place, so as to be immovable until the wedge is withdrawn. If a mere square opening is formed in the bracket to receive the end of the spring, the latter would be prevented from turning; but in case of a heavy side lurch of the wagon-body the end of the spring would be liable to be drawn out of the opening, and thus render the spring useless. By keying the end of the spring in the opening all danger of this kind is avoided. Further, if the squared end of the spring is merely inserted into a square aperture, after a time the said aperture or the end of the spring will become worn, and then a rattle will be the result. When a slot is provided in which a wedge or key is driven, this wear may be taken up and all rattle avoided.

There are two main advantages gained by providing the above-described movable cap to form one side of the bearing H. The wear on the bearing may be taken up, as described, and the spring may be more easily adjusted in the bearing. If the bearing is not provided with a cap or a similar device, the entire length of the spring must be passed through the bearing, and it is obvious that under these circumstances it is almost impossible to make a tight-fitting bearing free from rattle. It will be very readily seen that if the bearing is made large enough to allow the entire spring to be passed therethrough it would not accurately fit any one point. Further, it might be desired to form the center of the squared end of the spring slightly larger than the portion within the bearing, and in this case it would be impossible to adjust the spring therein.

The herein-described device is simple, may be cheaply manufactured, and will be found very durable.

Having thus described my invention, I claim—

1. The combination, with the wagon-body, of the brackets or spring-boxes attached to the under side thereof and having the bearings H and the slots I therein, the torsion-springs K, journaled in the bearings H and having their squared ends engaged in the slots I, and the wedges L, secured in the said slots to maintain the ends of the spring therein, substantially as specified.

2. The herein-described brackets or boxes G, adapted to be secured to the under side of a wagon-body and having the slots I and the recesses *h* therein, the said recesses having converging sides, the springs K, journaled in the recesses and having squared ends fitting in the slots I, the wedge-shaped caps *h'*, fitting in the recesses *h* and bearing on the said springs, and the wedges or keys L, secured in the slots I, to hold the squared ends of the spring therein, substantially as specified.

In testimony that I claim the foregoing as my own I have hereto affixed my signature in presence of two witnesses.

HARRY A. MYERS.

Witnesses:
E. H. LAMBERTON,
JOHN H. SIGGERS.